Oct. 11, 1966     H. C. BECKER     3,278,676
APPARATUS FOR PRODUCING VISUAL AND AUDITORY STIMULATION
Original Filed May 7, 1958     2 Sheets-Sheet 1
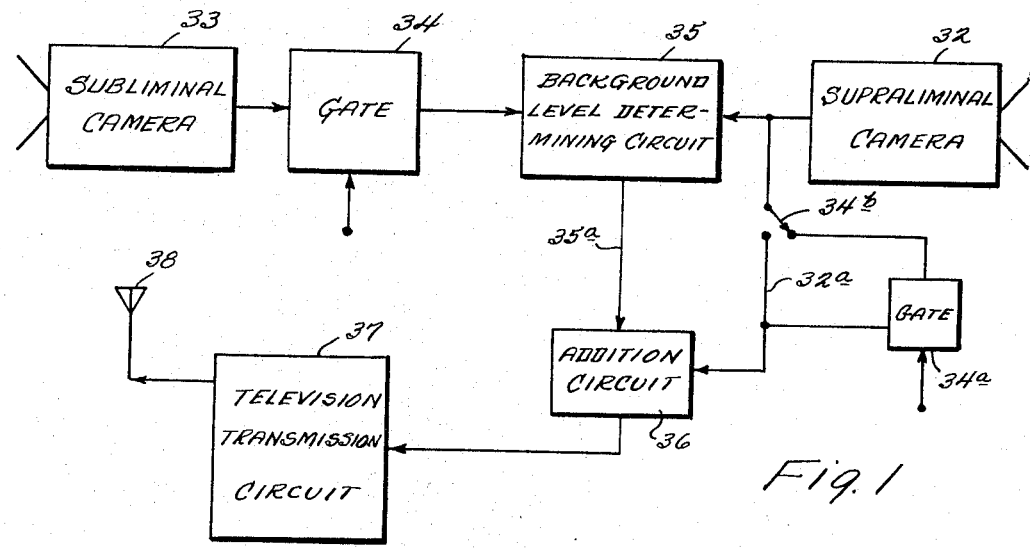
Fig. 1
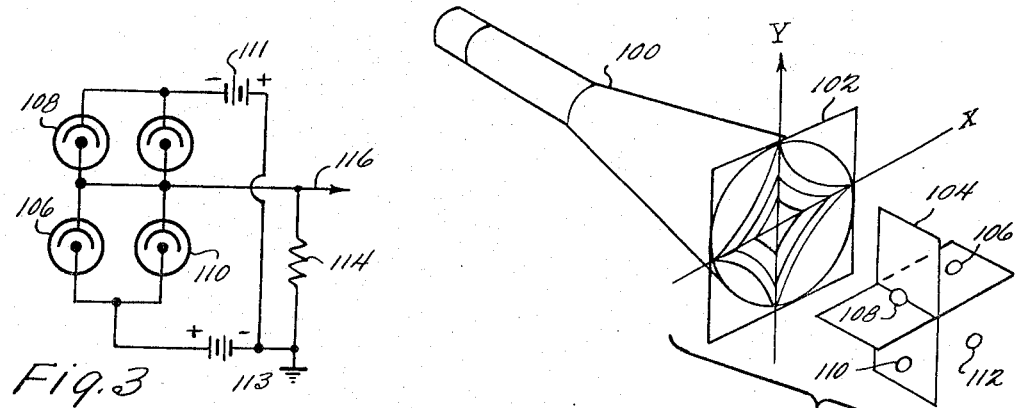
Fig. 3
Fig. 2
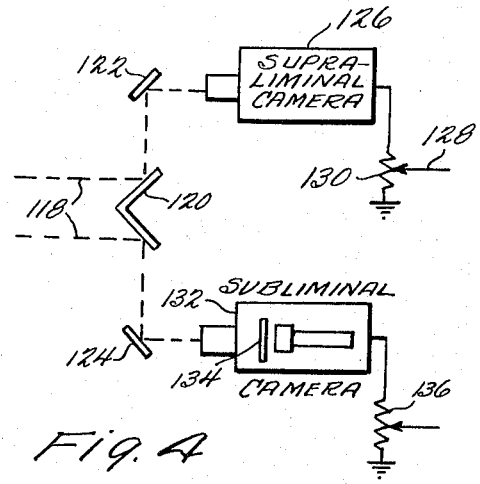
Fig. 4
INVENTOR
HAL C. BECKER
BY Cushman, Darby & Cushman
ATTORNEYS Oct. 11, 1966 H. C. BECKER 3,278,676
APPARATUS FOR PRODUCING VISUAL AND AUDITORY STIMULATION
Original Filed May 7, 1958 2 Sheets-Sheet 2

INVENTOR
HAL C. BECKER
BY Cushman, Darby & Cushman
ATTORNEYS

United States Patent Office 3,278,676
Patented Oct. 11, 1966

3,278,676
APPARATUS FOR PRODUCING VISUAL AND
AUDITORY STIMULATION
Hal C. Becker, New Orleans, La., assignor to Precon
Process and Equipment Corporation, a corporation of
Louisiana
Original application May 7, 1958, Ser. No. 733,713, now
Patent No. 3,060,795, dated Oct. 30, 1962. Divided
and this application Oct. 29, 1962, Ser. No. 241,456
31 Claims. (Cl. 178—6)

This application is a division of my copending application Serial No. 733,713 filed May 7, 1958, now Patent No. 3,060,795, granted October 30, 1962, which is a continuation in part of application Serial No. 590,868 filed June 12, 1956, now abandoned, which was a continuation in part of a still earlier application Serial No. 516,317 filed May 25, 1955, now abandoned.

The present invention relates to apparatus for producing visual and auditory stimulation at levels of awareness below that ability of an observer to report the stimulus verbally. More particularly, the present invention relates to apparatus for imparting useful information to an observer by subconscious stimulation and subsequently resulting in conscious purposive behavior of said observer without his awareness of the basis for such behavior, comprising means stimulating said observer below his conscious recognition level without said observer being consciously aware of any change in his environmental and physical status to impart information to said observer at said subconscious recognition level and said observer subsequently untilizing said information at the conscious recognition level.

No efforts have heretofore been directed to imparting useful information to an individual by stimulation solely below the conscious recognition level, i.e., prior to the individual's ability to verbally report stimuli. Prior workers in the general field utilized subconscious stimulation only preliminarily and always continued through to conscious recognition, thus positively changing the environmental and physical status of the individual upon whom the process was being applied.

Contrary to the above, the present invention depends upon the proved fact that humans are endowed with at least two levels of response, (1) the non-verbally reportable levels of awareness that establish that point at which stimuli will be verbally reportable, and (2) conscious awareness, i.e., the ability to report verbally the world around us.

A great amount of experimental work has been conducted in order to conclusively establish the fact that the foregoing two levels of response do exist. In carrying out these experiments, various types of apparatus as well as various media of application, were used. For example, the novel method can be carried out by means of the tachistoscope, television, motion pictures, magic lantern devices, controlled flash procedures used with signs, controlled temporal increase and decrease of brilliance of a sign, and/or combinations of the foregoing with appropriate auditory stimulation, e.g., radio, telephone and phonograph.

The above noted media can be used in various fields of endeavor. As will be appreciated from a more complete consideration of the invention, among the fields to which the said invention is best applied, are (1) medicine, psychiatry and psychology (as a diagnostic and theraeputic tool); (2) education (as an aid in teaching at all levels and, in particular, as a rehabilitative auxiliary in, for example, juvenile delinquency); (3) advertising and marketing (as point of sale advertising technique and as mass advertising process); (4) propaganda and psychological warfare (conditioning civilian and military personnel, enemy aliens, prisoners of war, or opposing forces or civilian population) and to counter "brainwashing"; and (5) enhancement of motion pictures.

My invention is particularly applicable to motion picture and television presentation. In this regard, it can be appreciated that the average individual is far more likely to come into contact with such media in the course of his everyday life. Accordingly, the apparatus utilized in practicing my invention has been primarily concerned with the motion picture and television field. However, this is not to say that it is not equally effective when applied to the other media noted heretofore and such other media form a part of this invention.

With the above in mind, the principal object of the present invention is to provide apparatus for the production of visual and auditory stimulation at levels of awareness below that ability of an observer to report the stimulus verbally, in order to induce selective perception resulting in selective overt response.

A more specific object of the invention is to provide means for imparting useful information to an observer by subconscious stimulation and subsequently resulting in conscious purposive behavior of said observer without his awareness of the basis for such behavior, comprising apparatus for stimulating said observer below his conscious recognition level without said observer being consciously aware of any change in his environment and physical status to impart information to said observer at his subconscious recognition level and said observer subsequently utilizing said information at the conscious recognition level.

Another object of this invention is to provide means for producing a response in a human being, said means being applicable to television or audio circuitry, and comprising a source of first signals and of second signals plus means to produce a product signal from the two sources of signals, said product signal being summed with the second signal for continuous presentation of the summed signal or alternate presentation thereof with the second signal.

A further and more specific object of the invention is to provide a means as noted heretofore wherein the information that is presented at the nonverbally reportable level of awareness is presented by way of sound frequencies, this sound being utilized for such short periods of time and sound intensity levels as to be imperceptible to the conscious level of awareness of the average individual.

Still further objects and the entire scope of applicability of the present invention will become apparent from the detailed description given hereinafter. It should be understood, however, that the detailed description and specific examples, while indicating the preferred embodiments of the invention, are given by way of illustration only, since various changes and modifications within the spirit and scope of the invention will become apparent to those skilled in the art from this detailed description.

Reference is made to the accompanying drawings wherein:

FIGURE 1 is a block diagram of television circuitry embodying this invention;

FIGURE 2 illustrates a beam deflection hyperbolic mask type of analog multiplier;

FIGURE 3 shows circuitry for the photoelectric cells used with the apparatus of FIGURE 9A;

FIGURE 4 illustrates another type of analog multiplier; and

Figure 5:
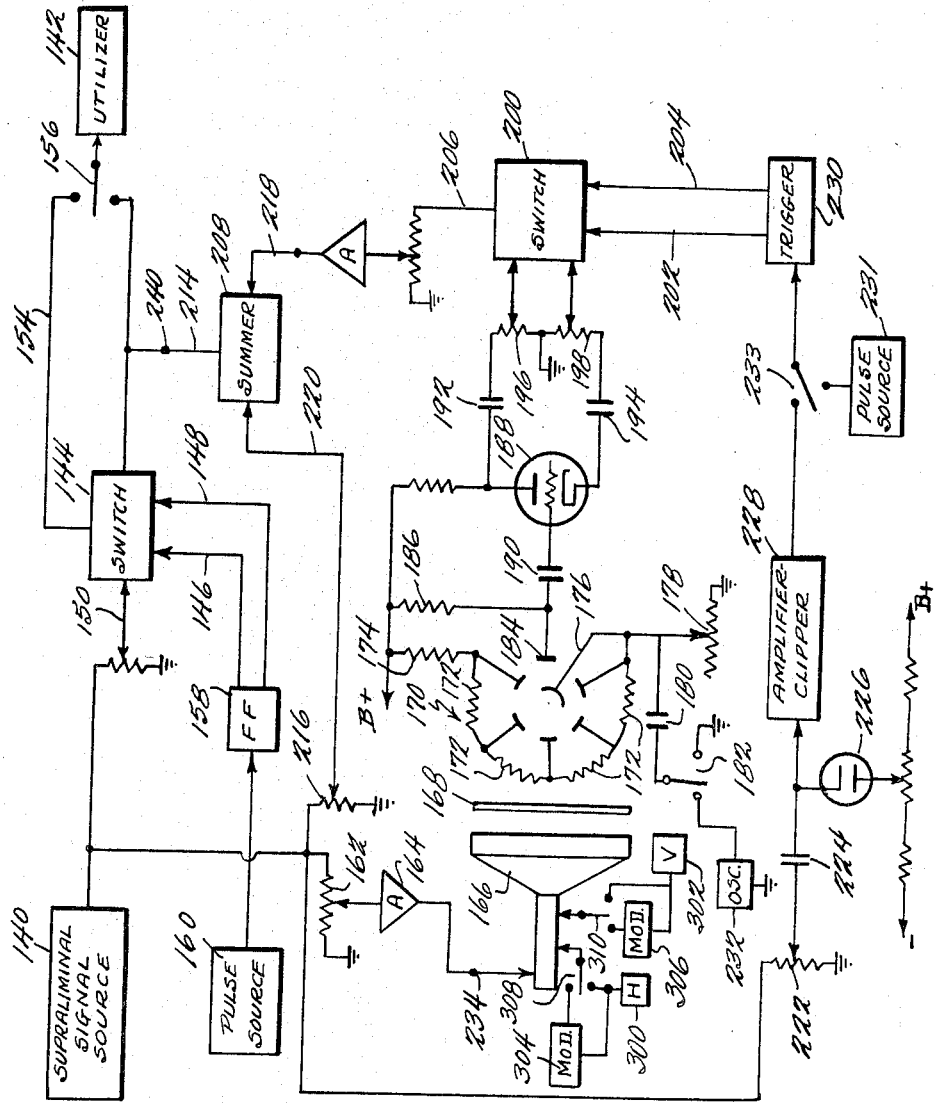
FIGURE 5 shows still another type of analog multiplier and circuitry for applying this invention to either audio or video transmitting or receiving systems.

This invention basically involves the following sequence. Visual and/or auditory subject matter is presented to an individual at the nonverbally reportable levels of awareness, i.e., at that point at which only subconscious realization occurs. As noted heretofore, this subconscious visual or auditory presentation can be carried out in a number of ways and is always carried out without said individual being consciously aware of any change in his environmental and physical status.

Generally speaking, visual stimulation may be carried out by flashing the subliminal subject matter within the vision of the individual involved, but at such temporal duration, repetition rate, and/or light intensity as to make the subject matter imperceptible to the conscious level of awareness of said individual. Rather than intermittently flashing the subliminal subject matter, continuous temporal nondiscrete presentation can be used as will be detailed hereinafter.

With respect to auditory stimulation, the presentation of sound frequencies continuously or at extremely brief duration times with low sound intensity levels may be utilized. As can be appreciated, the subject matter is presented in this way in order to penetrate the subconscious awareness of the individual by way of auditory response.

In order to properly determine the fact that a subconscious level of perception exists, and to evaluate results obtained, a series of experiments were conducted wherein individuals were subjected to certain tests investigating the reliability and validity of selected visual, verbal and motor responses as indicators of personal values in perception. Three experimental procedures were used, namely: (a) the word association technique, (b) the tachistoscopic technique, and (c) the Luria motor technique.

Subjects were practiced to respond with a preferred hand by voluntary depression of a key depressor simultaneously with their verbal response in the word association and the tachistoscopic technique. Graphic tracings were recorded and analyzed into four distinct indices measuring motor response between the application of the stimulus matter, either visual or auditory, and the point of completion of key depressing activity by the preferred hand.

The words presented in the word association and tachistoscopic technique were identical. Three categories of words were used as the subject matter and represented three degrees of increased judged emotional implications. The individuals utilized were drawn from various fields of study and were tested both with preknowledge of the words used and without preknowledge thereof.

For the tachistoscopic phase the subjects were initially presented the stimulus words at a point below the main conscious level for words of little or no emotional implication. Tachistoscopic presentations were then made in constant time increments for all categories of stimulus words and for all individuals, up to the point of correct response.

As a result of experiments as outlined heretofore, it was established that individuals were influenced in significantly greater amounts the further the distance from conscious awareness. Further, it was shown that individuals selectively respond to stimulus words of increased judged emotion (such as "rape" as compared to "water"), prior to their ability to report orally the correct stimulus word, i.e., at a subconscious recognition level of awareness. These tests strongly evidenced the fact that a subconscious recognition cognitive process including discrimination, evaluation, integration and organization, actually does occur at such recognition levels. Such cognitive process is believed to operate prior to one's ability to consciously report the most neutral of visual stimuli and is the basis for my novel process and apparatus, to wit, the utilization of subconscious recognition levels of awareness to influence subsequent conscious behavior.

In line with the above, other experiments were conducted, as for example, conditioning neutral word stimuli with palmar shock at levels of awareness below the ability to correctly report the presented stimulus word. The results of such further experiments corroborate the experiments described heretofore.

Based on the conclusions noted heretofore, it has been proved that individuals perceive at non-reportable levels of awareness. With this in mind, the process and apparatus of this invention were developed to impart information to individuals at the subconscious level, such information subsequently being utilized at a conscious level.

As an example, subjects were presented problems to solve in three separate steps under conditions such that half of these subjects (the experimental group) were presented the solutions to the problems at the subconscious level of recognition, and the other half of the subjects (the control group) were presented a series of XXXXX's at the subconscious level of recognition. The times required for problem solution by subjects in the experimental and control groups were recorded. Problem solution times required by subjects in the experimental group (those who were presented the solution subliminally) were significantly shorter (shorter by 50%) than the solution times required by the subjects of the control group who were presented meaningless material subliminally (i.e., presented the series of XXXXX's subliminally).

A part of this invention is the discovery that the environmental conditions surrounding the presentation of the subliminal and supraliminal material to the subject have an effect on the results obtained. One aspect of this point involves the fact that the character of the supraliminal material many times affects in the receptivity at a subconscious level of recongition of the subliminally presented material. Thus, if the subject favorably reacts to the consciously presented material, many times he is more likely to be more receptive to the subliminal material being coincidentally presented. On the other hand, if the consciously presented material is not liked by the observer, then the subliminal material is statistically less readily received.

Conversely, the character of the subliminal material affects the receptivity of the supraliminal material. If the subject subconsciously favorably reacts to the subliminal material, he is more likely to react favorably to the supraliminally presented material. This factor is of great utility in, for example, advertising. An illustration would be the analysis of a subject as to his feelings about a certain trade mark by presenting the trade mark subliminally and ascertaining its influence on the receptivity of supraliminal material.

Along the same lines as noted heretofore, the seating position of a subject during the presentation of the subliminal and supraliminal material is important. Further, the degree of continuity in the presentation procedures and conditions, such as temperature, light, incidental distractions, e.g., insects, and the like, are factors to be considered. Of course, it can be appreciated that since both positive and negative factors are interacting simultaneously, the statistics of the system in large group presentation yield an end effect which is an average predictable result.

Before relating specific apparatus which can be used in the application of this invention, general statements should be considered. For example, in medicine, psychiatry and psychology, this invention might function.

In education, this invention can be similarly utilized. Particularly, we have in mind the current problems faced by teachers involving juvenile delinquents and the latter's rejection of sincere efforts to impart knowledge to them. By utilizing this invention, such delinquents can actually be imparted information of a cultural nature through their subconscious perceptibility and yet by holding their attention through a presentation of a picture appealing to their conscious level of perceptibility.

Advertising and marketing is a further immense field for utilization of this invention. For example, by means of television and on an auditory level by means of radio or the sound channel in television systems for example, advertising slogans and/or symbols can be presented to the subconscious level of perception of the potential consumer, whereas such presentation would many times be rejected if presented to the said consumer at a conscious level of awareness.

As noted heretofore, this invention can be applied in an inventive manner to the medium of television. Numerous complications are presented in the use of such a medium. For example, the television viewer has individual brightness and contrast controls available for manipulation on his own television receiver. In addition, television involves fixed duration of exposure intervals. Compare this with motion picture projection wherein it is possible to vary such duration of exposure by use of shutters having different sector angles as noted heretofore in this specification.

As pointed out in my said parent Patent No. 3,060,795 with respect to motion picture projection, the light intensity of the subliminal material must be a function of the light intensity of the supraliminal material in order that the subliminal material always remain, in actuality, subliminal. This same axion, of course, is applicable to television.

In television, the supraliminal material appears at the transmitter as a voltage having a magnitude varying as a function of time. This time varying voltage will be referred to as the standard video signal and it might be derived, without limitation intended, from any of the following:

(a) Live camera pickup.
(b) Motion picture pickup.
(c) Tape recorder pickup.
(d) Combinations of the above with coaxial cable or other transmission from point of origin.

FIGURE 1 shows in block diagram form an exemplary television transmitter circuit for carrying out this aspect of the invention. Television camera 32 is trained on the scene intended to be presented as supraliminal material, while television camera 33 is trained on a scene to be presented as subliminal material. The video signal output of camera 33 is passed through gate circuit 34. A suitable signal may be placed on the second input to gate circuit 34 to pass or to block video signals through gate 34 from camera 33. Thus, gate 34 may be employed where it is not desired to present the subliminal material concurrently with the supraliminal material.

Gate 34a might be utilized in the circuit by means of switch 34b. Thus, the supraliminal material may also be blocked if it is desired to present only subliminal material or if it is desired to present supraliminal material periodically at a definite rate.

A portion of the video signal output of supraliminal camera 32 may be utilized in a background level determining circuit 35 to control the overall base or background brightness level of the video signals from subliminal camera 33 issuing from gate 34. The video signals from camera 32 inserted into circuit 35 may be integrated if desired, over one or more line scan periods. This integrated voltage can be placed on a tube grid or the like to control the amplification of video signals from subliminal camera 33. Thus, an output line 35a of circuit 35, subliminal video signals are available, nevertheless modulated in intensity dependent upon the average brightness of the supraliminal video signals. This has analogy in the photo-electric cell pick-up in FIGURE 6 in my parent Patent No. 3,060,795.

Circuit 35 can also function to achieve modulation in accordance with the instantaneous brightness of each effective picture element of the supraliminal material. Suitable circuitry known in the art is used for this alternative means for controlling the base or background brightness of the video signals from subliminal camera 33.

The modulated subliminal video signals on line 35a and supraliminal video signals on line 32a leading directly from camera 32, can then be added in any suitable addition circuit 36 before presentation to conventional television transmission circuits 37 and radiating antenna 38. Any conventional television receiver tuned to the carrier frequency, will then display video signals whereby will be present the subliminal as well as the supraliminal material.

It will be noted that if subliminal material is to be presented concurrently with the supraliminal material, the gates 34 and 34a may be dispensed with. It should also be noted that the background level determining circuit 35 can be dispensed with if modulation of the subliminal material corresponding to the general brightness of the supraliminal material is not desired.

It can be appreciated that FIGURE 1 does not attempt to show all of the conventional components of a television transmission system, and it should be assumed that otherwise normalization, D.C. level determining and so called D.C. reinsertion circuitry would be provided.

For convenience, the signal as produced from a subliminal information matrix, as via camera 33 for example, will be hereinafter referred to as the $x$ signal, while the standard video signal, such as that produced by the supraliminal camera 32, will be referred to as the $y$ signal. As above indicated, modulation of the $y$ signal by the $x$ signal may be achieved in circuit 35 of FIGURE 1. The type of modulation which may be used to mix these signals includes, without limitation being intended, (1) amplitude modulation per se and (2) multiplication per se. For amplitude modulation, the classical plate, grid bias, or cathode types of modulation processes may be employed. Additionally, a balanced modulator of any desired design may be used and presently provides the preferred type of amplitude modulation for mixing the two signals to provide a modulated signal on output line 35a. As is well known, any type of amplitude modulation of one signal by another, say $y$ by $x$, yields not only a product signal $xy$ but also the modulated signal too. That is, when circuit 35 accomplishes amplitude modulation, the resulting signal on line 35a is $y+kxy$ where $k$ is a constant which helps provide the desired balance between the component signals. Generally, the effective end value of $k$ is set by one or more gain controlling potentiometers within the system, and further reference to $k$ per se will not be made herein, it being understood that the $y$ and/or $xy$ signals as hereinafter referred to are of such relative amplitude as to include whatever balancing factors desired.

With amplitude modulation inherently causing summation of the $y$ and $xy$ signals, circuit 36 need not be employed to accomplish addition but instead may be an OR circuit either of the mere physical junction type or of the more complicated diode-resistance type, for example. However, regardless of whether circuit 36 is an addition circuit or an OR circuit, the television transmission circuits 37 can receive the $y$ and $y+xy$ signals alternately or the latter continuously if desired by use of gates 34 and 34a. For example, if it is desired to present the $y+xy$ signal only for a time (or continuously) gate 34 is enabled and gate 34a is disabled for such time. Of course if presentation of the $y+xy$ signal is desired at all times, line 35a can be connected directly to circuit 37, thereby eliminating circuit 36 and gates 34, 34a. On the other hand, if presentation of only the $y$ signal is desired for a given time period (or continuously) gate 34 is disabled and gate 34a enabled during such time.

It is apparent then that the circuit illustrated in FIGURE 1 fully contemplates the inclusion of an amplitude modulator in circuit 35, or alternatively, fully contemplates modulation by multiplication of the $x$ and $y$ signals with addition thereto of the $y$ signal being accomplished in circuit 36. As above indicated, amplitude modulators or any of the various types are well known in the art and any such may be utilized in practicing this invention. By the same token many different multpliyng type modulators or analog multipliers, as they may be termed, are well known and may be incorporated in embodiments of this invention. However, examples of three different types of multiplying modulators in accordance with this invention are now described.

One type of such analog multipliers is illustrated in FIGURES 2 and 3. When the supraliminal and subliminal information is in the form of signals, such signals may be applied respectively to the horizontal and vertical deflection plates (not shown) of a cathode ray tube 100. Tube 100 is provided with a semitransparent mask 102 having hyperbolically graded optical density contours. Mask 102 is divided into four quadrants, I, II, III and IV, each of which includes a plurality of equilateral hyperbolas which are disposed at progressively greater distances from the intersection of the X and Y axes forming the quadrants. In each quadrant, the area beneath the hyperbola closest to the axes intersection is shaded heaviest, while the areas between successive hyperbolas are graded in optical density so as to have progressively greater optical transmittance. Mask 102 as shown is placed directly in front of, and preferably contiguous with, the screen of the cathode ray tube 100 with the center of the mask being over the center of the screen. From the foregoing, it is apparent that the optical transmittance of each area element of the mask may be a function of its two dimensional coordinates (X, Y) with respect to the X and Y axes of the quadrant system, and that the optical transmittance is equal to the product AXY where A is a constant for any particular mask.

To perform multiplication by the device shown in FIGURE 2, four photoelectric cells are disposed in front of mask 102 so that each cell responds only to light flux emanating from a different one of the four quadrants. That is, with the use of a quadrant light divider 104, photoelectric cell 106 responds only to the light flux from quadrant I, cell 108 responds only to the light flux from quadrant II, cell 110 responds only to the light from quadrant III, and cell 112 responds only to the light from quadrant IV. When these photoelectric cells are interconnected as shown in FIGURE 3 with the proper potentials from batteries 111 and 113 so as to insure that the instantaneous current of each cell is proportional to the total instantaneous light flux B received by each cell, the net current through resistor 114 will be proportional to the instantaneous luminance function, $$B_\mathrm{I}+B_\mathrm{III}-(B_\mathrm{II}+B_\mathrm{IV})$$

As long as the spot intensity of the cathode ray tube 100 remains constant and independent of spot scanning velocity, which can be assured if necessary by selection of proper phosphor and/or by means of an appropriate feedback circuit, then the instantaneous value of the net current in resistor 114 is proportional to the optical transmittance of the elemental area of the mask through which the cathode ray tube spot illuminates one of the photoelectric cells. Thus, the instantaneous voltage developed across the output resistance 114 is equal to the current therethrough times the resistance thereof, and this instanttaneous product therefore is proportional to the instantaneous product of the two input signals $x$ and $y$, with respect to time, as applied to the horizontal and vertical deflection plates. The signal on output line 116 is therefore the product signal $(xy)$ as multiplied by a constant related to the constant A for mask 102.

Besides the beam deflection hyperbolic mask type of analog multiplier which may conveniently be used with a semi-transparent or translucent type subliminal matrix, another analog multiplier which is preferably used with a transparency having the subliminal information thereon, is shown in FIGURE 4. This system is similar to that shown in FIGURE 1 except that the product video signal is derived from a modified camera. Light rays 118 emanating from the conscious level scene to be televised are split in any convenient manner such as by a prism, the semitransparent mirror 66 in FIG. 8A, in my parent Patent No. 3,060,795, or the V-shaped deflecting device 120 in FIGURE 4 hereof, no limitation to any of these particular devices being intended. The so deflected rays are thereby directed toward two different reflecting surfaces such as mirrors 122 and 124. Mirror 122 reflects the light rays to camera 126 which produces the supraliminal or $y$ video signals on line 128 adjusted in gain as desired by the potentiometer 130. The light rays deflected by mirror 124 are directed to the subliminal camera 132. It is apparent, of course, that mirrors 122 and 124 though preferably used are not essential to operation of this system since cameras 126 and 132 can respectively be disposed to receive the two light rays from beam splitting device 120. A transparency 134 which contains the subliminal information is placed in front of the photosensitive mosaic of the pickup tube in camera 132, and the light rays from mirror 124 are focused on the transparency and pass therethrough. The output signal from the subliminal camera as suitably adjusted in gain by potentiometer 136 is consequently the product $(xy)$ as multiplied by an appropriate constant.

Still another analog multiplying type modulator is illustrated in FIGURE 5. This figure also shows the invention as it may be related to either video or audio signals, and either a transmitting or receiving device. That is, the supraliminal signal source 140 may be considered as a source of either video signals or audio signals, and these may be obtained from any number of different sources such as a television camera, a microphone, or the video or audio detecting circuits in television or radio receivers. Assuming the supraliminal signal source is a television camera, the circuit of FIGURE 5 is similar to that of FIGURE 1 and source 140 could thereby be correlated to camera 32 of FIGURE 1. However, as above indicated, it is to be understood that the supraliminal signal source 140 of FIGURE 5 can be a video signal detector or the like in a television receiver. The same, of course, applies to audio systems.

In like manner, utilizer 142 refers to the appropriate corresponding utilizing means of the type system employed. For example, if the supraliminal signal source 140 is a television camera, utilizer 142 may be considered as the television transmission circuit 37 of FIGURE 9. If the source 140 is the video detection system of a receiver, the utilizer 142 would, of course, be the usual cathode ray tube circuitry in the receiver. Corresponding considerations for audio systems may likewise be applied.

FIGURE 5 illustrates several modifications, one of which is the switching between the supraliminal signal and the summed signal $(y+xy)$ from time to time. That is, switch 144 (which may be considered as an electronic switch including, for example, two pentodes which are alternately turned off and on by the signals on lines 146 and 148) alternately passes the input signals present on lines 150 and 152 to line 154 and thence to utilizer 142 when switch 156 is in its up position. The signals on input lines 150 and 152 may respectively be considered the supraliminal or $y$ signal and the summed signal $(y+xy)$, both properly adjusted to gain to provide the desired results. Switching between these two signals is accomplished by applying pulses to the flip-flop circuit 158 in such a manner that it will toggle between its two stable states and provide automatically high and low voltage output signals alternately on both output lines 146 and 148. Such pulses may be obtained from a pulse source 160. The pulses may be of any desired repetition rate, and may be for example synchronizing pulses such as the vertical or horizontal synchronizing pulses in a television transmitting system or similar pulses extracted from a television receiver system. Preferably, the pulses are vertical synchronizing pulses in a television system, but limitation thereto is not intended since other repetition rates including horizontal pulse rates or groups thereof, or multiples and submultiples of either horizontal or vertical synchronizing frequencies may be used. In audio systems, the pulse rate is preferably at a frequency sufficiently high to prevent audibility of any switching transients produced. However, lower switching frequencies may be employed where the switching transients, if any, are not distracting or if a switching transient squelching system is used. Additionally, as will be later described, the $y$ and $xy$ signals in either audio or video systems may be applied simultaneously, preferably in the form of a summed signal, to the utilizer 142 with no switching therebetween whatsoever.

To effect modulation of $x$ and $y$ signals, the $y$ signal from the supraliminal signal source 140 is applied through a gain controlling potentiometer 162 and amplifier 164 if desired to scanner 166. This scanner is preferably of the flying spot cathode ray tube type. The subliminal information as present on the matrix 168 disposed in front of scanner 166 is scanned line-by-line by the flying light spot emanating from scanner 166 at any desirable line and field rate as caused by the frequency of signals from sources 300 and 302 when switches 308 and 310 are in their most counter-clockwise position. Since the beam in the scanner is modulated in intensity by the $y$ signal as delivered thereto from amplifier 164, the signal produced by photoelectric cell 170 is an $xy$ product signal, $x$ being referred to the subliminal information on matrix 168. As used in this specification and appended claims, "matrix" refers to a transparency which contains its information by different elemental areas having different densities, and to equivalents of such a transparency.

Preferably, the photoelectric cell 170 takes the form of a photomultiplier with the several resistor 172 being connected between the different dynodes, the first of which is coupled to a source of B+ via resistor 174. The last dynode is coupled in common with cathode 176 to ground through a gain controlling potentiometer 178 and condenser 180 when switch 182 is in its rightward position. The plate or collector 184 of the photoelectric cell is coupled to B+ in the usual manner through resistor 186, and also to tube 188 via condenser 190.

As is well known, a vacuum tube may be operated to cause inversion of a signal, or alternatively, may be operated as a cathode follower wherein no signal inversion takes place. Taking advantage of this fact for purposes presently more apparent, the outputs from both the plate and cathode circuits of tube 188 are respectively coupled via condensers 192 and 194 and potentiometers 196, 198 to switch 200. In one embodiment, switch 200 may be considered merely as a single-pole (or double-pole, if desired) double-throw mechanical type switch, switchable manually or automatically in any periodic or aperiodic manner, without lines 202 and 204 and associated circuit being connected thereto. With such a switch, the polarity of the product signal delivered to output line 206 from the switch, may be changed as desired as between positive and negative product signals. With the product signal on line 206 being applied to the summer or addition type circuit 208, preferably via a gain controlling potentiometer 210 and amplifier 212, if desired, over line 218, and the $y$ signal as obtained in its proper proportion by gain controlling potentiometer 216 being applied to summer 208 over line 220, the output of summer 208 on line 214 is the $y$ signal plus the $xy$ signal with the polarity of the latter signal being determined by switch 200. Therefore, in a television system, for example, it is apparent that the subliminal information may be presented as either relatively light material or on a blacker background or relatively dark material on a whiter background.

Addition or summing circuits are well known in the art, and summer 208 may take the form of, for example, two triodes whose cathodes are commonly coupled and whose grids are respectively connected to input lines 218 and 220. Output line 214 is then coupled to one of the plate circuits of the two tubes.

With the signal on line 214, and consequently on line 152, being the sum of the $y$ signals and the product signals $xy$, in properly controlled proportions, switch 144 provides these signals as summed to line 154 when in one of its states. When the switch is in its opposite state, only the $y$ signals as present on line 150 are applied to line 154. Therefore, when switch 156 is in its up position, utilizer 142 alternately receives $y$ signals and then $y+xy$ signals. If it is desired to present the subliminal information continuously, rather than periodically such as on alternate fields in a television system, switch 156 may be placed in its downward position so that the $y+xy$ signals on line 214 are applied directly to utilizer 142.

Mention was above made that in one embodiment switch 200 of FIGURE 5 is a mechanical type switch for changing the polarity of product signals. Alternately, this switch may be of the electronic type similar to switch 144 so as to cause automatic change betwen the two possible polarities of the product signals at predetermined times. Such automatic switching may be accomplished (1) without regard to the intensity or amplitude of the supraliminal signal, (2) with regard only to such, or (3) by combination of (1) and (2). To accomplish (1) trigger circuit 230 may be a flip-flop which is toggled between its two stable states by successive pulses from source 231 when switch 233 is positioned downwardly. Such pulses may be derived from any source within or without the system being used and may be of any frequency desired. Relative to (2) assume the normal situation of a white background with supraliminal information being shown in different hues or in shades of gray to black, and further assume that subliminal information is to be presented during the whole of one or more given fields in the form of relatively dark information on a whiter background. It then becomes apparent that the subliminal signal will be decreased in intensity sufficient to be at least substantially, if not wholly ineffective when the supraliminal signal is at least such as to cause a black or nearly dark screen. Under such circumstances, the polarity of the subliminal or product $xy$ signal may be changed so as to cause relatively light subliminal information on a darker background.

To maintain the presentation of subliminal information throughout any given time period, regardless of the shade or color of the supraliminal information (i.e., so as to effect (2) above), a system such as further shown in FIGURE 5 may be employed. With the supraliminal or $y$ signal being changeable from a white level to a black level for example, a given threshold may be established between these levels so that a movement of the $y$ signal across the threshold in either direction effects switching of switch 200. For example, the threshold level may be set so as to be equal to a signal causing a 50% brightness level, or at any other higher or lower level as desired. Then, when the $y$ signal moves from white toward black and crosses the threshold level, a signal is produced for example in the manner to be presently described, to effect switching of switch 200. Conversely, when the $y$ signal reduces its amplitude from black to white and recrosses the threshold level, switch 200 is caused to switch back to its other state. The threshold level which causes the switch to change its state may be established by the circuitry including potentiometer 222, coupling condenser 224, clamping diode 226 with the associated voltage determining circuitry as connected to its plate, amplifier-clipper 228, switch 233 in its up position, and trigger circuit 230. The trigger circuit 230 acts to cause an enabling signal on line 202 when the $y$ signal crosses the threshold level in one direction, and an enabling signal on line 204 when the $y$ signal crosses the threshold level in the opposite direction. Therefore, the output of switch 200 changes from one polarity to the other polarity each time the $y$ signal crosses the threshold level.

To accomplish (3) above whereby the polarity of the $xy$ signal is changed in accordance with both the pulses from source 231 and a threshold level, pulses from source 231 and the output from amplifier-clipper 228 may be commonly coupled to the input of trigger circuit 230 without any further considerations especially when the threshold level is equal to or in the general amplitude area of a signal causing approximately 50% brightness. However, when the threshold level does not correspond to approximately the 50% brightness level, sensing means may be placed in line 206 to sense the existing polarity of the $xy$ signal and to provide a signal to gate the pulses from source 231 so as to prevent polarity changes when the $y$ signal is on the black side of the threshold level and the $xy$ signal is already of a polarity causing effective communication thereof.

Reference has heretofore been made to the effect that the circuitry of FIGURE 5 is, in any of its different forms, applicable to audio systems and this is especially true if switch 144 is switched at speeds high enough not to cause objectionable audio transients. An alternative to employing switch 144 as shown in FIGURE 5 is the use of a switch or gate in line 206 with switch 156 positioned downwardly, whereby the signal to utilizer 142 may be either $y$ or $y+xy$. This is applicable to either audio or video systems and is similar to one use of gate 34 in FIGURE 1. Instead of adding a gate in line 206, switch 200 may be of course modified to cut out the $xy$ signal when desired. With the use of either an added gate of the modification of switch 200 in an audio system, effects from transients produced by such gating or switching would be inaudible to a listener since the intensity of the subliminal audio or product signal as reproduced is below the conscious level of recognition.

Because of the differences in the physical nature of video and audio signals and in the physiological transducing mechanisms for handling the two types of signals, optimalization of subliminal audio communication may be effected by causing the supraliminal signal $y$ before multiplication thereof by the subliminal signal $x$ to pass through a rectifier-intergrator system or other generally non-linear system to provide a modified supraliminal signal Y. If an amplitude modulator is then used to combine the $x$ and Y signals, the result is $Y+xY$ wherein the product signal component is desirably balanced with the Y signal component. Since the final signal desired in this case is $y+xY$ in proper proportions, a subtractor may be coupled to the Y source and modulator to provide the desired $xY$ component and the original supraliminal signal may be added thereto in a summing circuit. Of course, if an analog multiplier per se is employed to form the product signal $xY$, no subtractor is required.

From all the foregoing relative to FIGURE 5, it is of course apparent that any of the heretofore referred to analog multipliers may replace the scanner-photoelectric type analog multplier of FIGURE 5 so as to be operable with the remaining circuitry thereof in any of its numerous embodiments.

It is important to note at this point that certain experiments which have been conducted, have indicated that modulation of the light intensity of either or both the subliminally presented material and the supraliminally presented material at brain wave frequencies increases the effectiveness of the subliminal stimulation. Of particular significance is the modulation of the resulting light intensity of the subliminal information and/or the supraliminal information by what is known in the art as the "alpha rhythm" frequencies including multiples or submultiples thereof. Modulation by such brain wave frequencies can also be incorporated in the repetition rate of presentation of the subliminal material.

As is known in the art, a normal range of alpha rhythm frequency response is found in any group of individuals. That is to say, every individual has a certain frequency of effect to which he is particularly receptive. Accordingly, using an average brain wave frequency designed for the particular individuals to whom this invention is being applied has been found to significantly increase the results obtained. As above indicated, modulation may be not only at alpha frequencies, but also at other brain wave frequencies, and significant results may likewise be obtained.

Increasing the effectiveness of the subliminal information by modulation with brain wave frequencies such as a frequency or frequencies from the alpha range of frequencies, may be accomplished in a number of different waves. For example, any of the different methods mentioned in my parent Patent No. 3,060,795 relative to motion picture projection may be employed. Additionally, the ambient illumination on a studio television scene being scanned can be modulated in intensity either continuously or periodically in phase with the periodicity of the use of the summed $y$ and $xy$ signals. Alternately, the ambient illumination of a television screen and/or viewing area could likewise be intensity modulated.

Further intensity modulation can be caused by modulating the $y$ or $x$ signals or any combination thereof as produced, for example, in FIGURE 5. With reference to this figure again, it will be noted that oscillation producing means 232 may be connected by switch 182 into the cathode circuit of the photomultiplier 170. When so connected, the product signal collected by plate 184 will be modulated at a frequency determined by modulator 232. Preferably, such a frequency is one of the brain wave frequencies such as alpha. An average alpha frequency for adults is approximately 10 cycles per second, although limitation thereto is not intended, and production of such a signal whether sinusoidal or not may be accomplished in any well known manner. For example, oscillation producing means 232 may be just a 10 cycle or the like oscillator.

However, in a television system wherein low frequency response is poor, for example in a system wherein D.C. brightness levels are not reinserted by means of some type of D.C. restorer device, such a frequency may be produced in accordance with this invention, by utilization of two other frequencies which differ by the brain wave frequency desired. When the circuit of FIGURE 5 is employed in a television transmitting and/or receiving system, the brightness of any viewing screen in the system can be used to vary effectively at the desired modulation frequency, regardless of the frequency response ability of a receiver, by causing such brightness variations either along the horizontal direction only, the vertical direction only, or both. Variation along one direction only may be produced by modulating a wave of the corresponding synchronizing signal with another frequency slightly different therefrom. For example, a sinusoid or other type wave of conventional line frequency, 15.75 kc./sec., may be modulated by another signal which is, for example, 10 cycles lower or higher than the horizontal line frequency signal so as to effectively produce the desired brain wave frequency variation. Modulation of the two signals may be accomplished either by algerbraic summation, multiplication or amplitude modulation. As will be apparent to those of ordinary skill in the art, the output of oscillation producing means 232 under such circumstances is not merely a 10 cycle (or the like) wave, but contains waves of the basic frequencies as well. Therefore, when the basic modulated signal is of the line frequency of the system, brain wave frequency modulation is mainly along the horizontal direction of the screen. Likewise, if the basic modulated signal is of field frequency, the desired brightness modulation occurs mainly along the vertical direction of the screen. Moreover, the brightness of the screen may be varied in both horizontal and vertical directions by combining the two modulating systems.

Instead of modulating the $xy$ signals in FIGURE 5 at the cathode of photomultiplier 170, brain wave frequency modulation in any of the manners above described may be applied to the system at any one of a number of other different locations. For example, such modulations may be applied at junction 234 whereby the $y$ signal intensity before multiplication with the $x$ signal is modulated. Alternatively, the $y$ signal as present at junction 236 can be modulated so that the summed output on line 214 varies accordingly. Again, alternatively, the $xy$ product signal on line 218 may be modulated at junction 238, or the summed output itself as present on line 214 may be modulated as at junction 240. The latter may conveniently be done since any normally resulting flicker of the visual message may be regulated by controlling the amplitude of the modulation.

Brain wave modulation is not intended to be limited to the circuitry shown in FIGURE 5, but may be included in any of the systems heretofore described. As to the television circuitry shown in FIGURE 1, gates 34 and 34a can be used to vary the presentation of both, or either, the subliminal and supraliminal information at any desired frequency.

Although, in FIGURE 5, the matrix 168 which contains the subliminal information, has been referred to as a transparency, it is to be understood that the matrix may actually be nontransparent with the information thereon having a different reflective characteristic relative to the background of the matrix. In this manner, the photoelectric cell may be placed on the same side of the matrix as the scanner 166, and the result will be the same as though the matrix were transparent. Use of the term "absorption characteristics" relative to the matrix is meant to include both the concepts of a transparent matrix or one which is nontransparent but reflective of the information. That is, it may be said that the information on the matrix differs in its light absorption characteristics from that of the background portion of the matrix regardless of whether the matrix is of the transparent type or of the nonttransparent type.

The numerous ways described in my parent Patent No. 3,060,795, of imparting motion to motion picture systems and also to stationary displays, are also applicable to audio, and television systems. In an audio, television, or any other system wherein the subliminal information is scanned electronically, as by camera 33 in FIGURE 1 or the flying spot cathode ray tube 166 in FIGURE 5 for example motion in any desired time pattern may be effected in any of a number of different ways. For example, as shown in FIGURE 5, the horizontal and/or vertical sweep voltages from sources 300 and 302, respectively, may be modulated by an algebraic summation process with any desirable signal frequencies in modulators 304 and 306 when the corresponding switch 308, 310 is thrown clockwise. With such modulation, the sweep voltage sawtooth wave is effectively moved as a whole up or down by virtue of variation in its D.C. base, thereby causing the scan to begin on time, or early or late to any desired degree. Preferably, the modulation is such as to keep the sweep voltage or voltages on a given D.C. base for a plurality of fields so that the desired movement effect is not obviated by the movement being too fast. Rather than using modulators 304 and 306, the respective synchronizing pulses normally employed to trigger the sweep oscillators 300 and 302, can be variously delay to effect the desired movement.

It has been pointed out heretofore that aural techniques somewhat analogous to the visual techniques described above will permit effective use of the method via the aural sensory receptors of man. This can be achieved separately from or simultaneously with process operation via visual sensory apparatus.

Although prior workers in the aural field have achieved subconscious stimulation by means of subliminal presentation of stimulus material, and have attempted simultaneous presentation of subliminal and supraliminal aural material without any modulation of the latter by the former, none has utilized such subliminal presentation per se temporally interleaved with supraliminally recognizable aural stimulus material. The following technique, utilizing the principles of our invention as applied to temporally interleaved supraliminal and subliminal aural presentation is hereinafter described.

The two aural stimuli are presented periodically and separately at a supersonic rate of presentation, i.e., at a frequency above the range of audibility of man. The analogy between this technique and the visual technique is clear in that, in the visual technique, critical flicker fusion frequency of man must be exceeded when the supraliminal and subliminal stimuli are interleaved, whereas in the aural technique, frequency of presentation must lie outside of the range of audibility of man. Any other presentation would result in audibility of the subliminal aural material and visual perception of the subliminal visual material, as the case may be.

Thus, in this embodiment of an aural technique according to this invention, alternate pulses of audio supraliminal and subliminal material are present. The parameters which determine the effect of the technique are similar to those outlined heretofore in connection with the visual technique. These are:

(1) Interleaving repetition rate.
(2) Relative (and absolute) temporal durations of supraliminal stimulus pulse versus subliminal stimulus pulse.
(3) Relative (and absolute) sound intensities of the two sets of pulses, and
(4) Background or ambient aural conditions of the subject's environment.

Particular apparatus utilized in applying this aural technique is not specifically illustrated but can be appreciated from a consideration of the method described, especially in view of the circuitry of FIGURES 1 and 5. The equipment basically involves a source of supraliminal and subliminal audio material along with an electronically controlled device, such as switch 144 in FIGURE 5 for example, to properly control the sequence of presentation periods of the respective audio material, as well as the duration and intensity of such material. The ambient aural conditions are controlled by standard means of regulating sound environment.

Incidentally, increasing the effectiveness of the aural technique may be accomplished by imparting motion to the resulting subliminal sound as by change thereof from one speaker to another in a multispeaker system, or by simultaneously modulating the intensity of any or all of the above listed parameters at stipulated frequencies, such as alpha rhythm frequency. The equipment for modulating such parameters may be similar to that shown in FIGURES 1 and 5 and it as well as motion imparting means can be readily realized through the use of standard sound equipment combined in such a manner to accomplish this invention.

In connection with the above aural technique, considerable stress has been placed on the temporal interleaving of the aural supraliminal and subliminal stimulus material. This does not mean that simultaneous presentation of such material is not contemplated especially in any embodiment wherein the supraliminal signal is modulated by the subliminal signal as previously referred to relative to FIGURE 5, but, rather, that interleaving without employing $xy$ signal modulation would appear to be more effective in accordance with the invention, than simultaneous presentation without such modulation.

The invention is applicable to the use of color for the presentation of both subliminal and supraliminal material, and such is contemplated by this application.

Throughout this specification it has been emphasized that various environmental and psychological factors can add or detract from the results attained by the utilization of the novel apparatus. These variables are, to a great extent, independent but should be noted as follows:

(1) The effect in reception of subliminal material as a function of a subject's conscious reaction towards the supraliminal material.
(2) The effect of established preferences for specific subliminal material on the expressed conscious state of feeling toward the supraliminal material.
(3) The effect in reception of subliminal material as a function of environmental factors associated with the presentation of both the supraliminal and subliminal material. These specific environmental factors include, for example, (a) the location of the individual during the presentation of the subliminal and supraliminal material, and (b) physical conditions such as temperature, spurious light, the presence of annoying elements, e.g., insects, and the like.

In connection with the above factors, it should be stated that normally, since both positive and negative factors are interacting simultaneously, the negative factors tend to be cancelled out with the net result being determined by the statistics of the system.

With respect to the experimental tests noted above, the tachistoscopic instrument used is an optical device which, in conjunction with appropriate electronic equipment, renders it possible to present visual material to a subject for predetermined intervals of time at various levels of illumination. The additional apparatus utilized in the experiments carried out has been generally described heretofore and was all used in order to establish the fact that a subconscious level of awareness exists and can be utilized at the conscious level of awareness.

By the novel method and apparatus of this invention, visual and auditory stimulation in individuals at levels of awareness below that ability of said individuals to report the stimulus verbally can be produced, thereby inducing selective perception resulting in selective overt response. The procedures and apparatus for achieving such subliminal stimulation are necessarily complex in view of the various positive and negative factors interacting simultaneously. However, it has been shown that when these factors are controlled, as disclosed heretofore, significant results are achieved.

These results are applicable to many fields of endeavor. The use of television picture techniques have obvious commercial, educational and medical applications. Perhaps, one of the most important applications is concerned with propaganda techniques. Wherever this invention is utilized, it offers untold opportunity to effectively influence behavior without the knowledge of the individual being influenced, thereby producing selective persuasive behavior without a person's conscious knowledge. It is also of great importance in analyzing the feelings of an individual by determining the effect of the subliminally presented material on the receptivity of the supraliminal material.

The novel principles of this invention are broader than the specific embodiments recited above, and rather than unduly extend this disclosure by attempting to list all the numerous modifications which have been conceived and reduced to practice during the course of this development, these novel features are covered in the following claims.

What is claimed is:

1. In a system of the type herein defined for subliminal presentation including a source of first electrical intelligence signals and further including apparatus for converting such signals into humanly sensible signals, the improvement comprising:

at least one matrix containing predetermined information, means to operate on said matrix for effectively converting said matrix information into a second sequential electrical intelligence signal, means responsive to said first and second electrical intelligence signals for producing an electrical summation signal, consisting of substantially said first intelligence signal and concurrently a product signal representing multiplication of substantially said first and second intelligence signals, to preserve the identity of the said second signal with uniform subliminal contrast relative to the said first signal, and means for conveying said electrical signal at least at predetermined times to said converting apparatus.

2. Apparatus as in claim 1 wherein the means for producing the summation signal includes an amplitude modulator.

3. Apparatus as in claim 2 wherein said conveying means includes switching means for alternately presenting the summation and first electrical signals to said converting apparatus.

4. Apparatus as in claim 1 wherein the means for producing the summation signal includes means for producing said product signal.

5. Apparatus as in claim 4 and further including means for modulating the product signal effectively at a frequency below about 50 cycles.

6. Apparatus as in claim 4 wherein the product signal producing means includes a multiplier and the summation signal producing means further includes addition means for adding the product signal to said first signal at least at predetermined times.

7. Apparatus as in claim 6 wherein the multiplier includes means for electronically scanning said matrix with a light beam varying in intensity in accordance with the amplitude of the said first signal and light sensitive means disposed adjacent said matrix for sensing the resulting light variations therefrom.

8. Apparatus as in claim 7 and further including means for modulating at least the product signal effectively at a frequency in the order of 10 cycles.

9. Apparatus as in claim 8 wherein the modulation means includes oscillation producing means for combining two signals differing in frequency by said frequency.

10. Apparatus as in claim 6 and further including switching means for changing the polarity of the product signal.

11. Apparatus as in claim 10 wherein the switching means is at least partially of the mechanical type.

12. Apparatus as in claim 10 wherein the switching means includes an electronic switch, and means coupled to said switch for alternately changing the state thereof to provide alternate polarities of said product signal.

13. Apparatus as in claim 10 wherein the intelligence signals are video signals, and further including means coupled to receive the video signals and to said switch for changing the state thereof each time the video signals cross a predetermined amplitude level.

14. Apparatus as in claim 4 including means for producing an $x$ signal representing said predetermined information, the product signal producing means being responsive to both the $x$ and first signals.

15. Apparatus as in claim 14 wherein the product signal producing means includes a cathode ray tube having a hyperbolically graded density contour mask disposed in front of the screen thereof, and a plurality of light sensitive means responsive to the light from said tube as emanating through said mask.

16. Apparatus as in claim 1 and further including means for changing the polarity of said product signal.

17. Apparatus as in claim 1 and further including means for modulating at least the second intelligence signals representing said predetermined information effectively at a sub-audio frequency.

18. Apparatus as in claim 1 including a source of energy providing light rays varying in accordance with said developed intelligence signal and including means for producing said product signal in response to said light rays.

19. Apparatus as in claim 18 wherein the means for producing said product signal includes means for scanning said matrix in accordance with the variations in said light rays.

20. Apparatus for imparting information to television receiver equipment comprising two television cameras, means for directing light in predetermined proportions to said cameras respectively, the light so directed to the cameras including given information, the output signals of the first of the cameras being representative of said given information, at least one matrix including predetermined information being disposed in the second of said cameras for modifying light signals received by the second camera, the output signals of said second camera including signals representing said given information as multiplied by signals representing said predetermined information, means for adding the output signals of said cameras, and means for conveying the so added signals at least at predetermined times to said receiver equipment.

21. Apparatus for imparting information, comprising means for obtaining intelligence signals $x$ representative of predetermined information, means for obtaining intelligence signals $y$ representative of other information, means including multiplying and summing means for mixing the signals from the respective means in predetermined proportions to effect an output signal representing the signal combination $y+xy$, and means for utilizing said output signal.

22. Apparatus as in claim 21 wherein the means for obtaining predetermined information type signals includes a television camera.

23. Apparatus as in claim 21 wherein the means for obtaining predetermined information type signals includes a matrix.

24. Apparatus as in claim 21 wherein the means for obtaining predetermined information type signals includes a transparency.

25. Apparatus as in claim 21 wherein the means for obtaining said other information signals includes at least part of a communication transmitting system.

26. Apparatus as in claim 21 wherein the means for obtaining said other information signals includes at least part of a communications receiving system.

27. Apparatus as in claim 21 and further including means for modulating at least the predetermined information signals.

28. In television transmission apparatus, first camera means for generating video signals $y$ representative of given intelligence, second camera means for generating video signals $x$ representative of other intelligence, means for combining the video signals from the respective camera means into the form $y+xy$, and means for transmitting the combined video signals.

29. Apparatus as in claim 28 wherein the combining means includes means connected in the output of the first camera means and also connected in the output of the second camera means for modifying the video signals thereof in accordance with the effective brightness of the video signals of the first camera means, the video signal combining means having one input connected to the output of the modifying means and another input directly from the first camera means.

30. Apparatus as claimed in claim 28 including gate means connected between the first camera means and the video signal combining means for suppressing video signals therebetween at predetermined times.

31. Apparatus as in claim 28 including gate means connected with the output of the second camera means for suppressing video signals therefrom at predetermined times.

References Cited by the Examiner

UNITED STATES PATENTS

| | | | |
|---|---|---|---|
| 625,627 | 5/1889 | Woody | 88—26 |
| 711,440 | 10/1902 | Ruchenbach | 88—16 |
| 1,356,223 | 10/1920 | Sawyer | 88—16 |
| 2,073,370 | 3/1937 | Goldsmith et al. | 178—6.8 X |
| 2,609,294 | 9/1952 | Prentice | 88—16 |
| 2,706,218 | 4/1955 | Wootten | 178—5.8 |
| 2,730,565 | 1/1956 | Owens | 178—6 |
| 2,772,600 | 12/1956 | Walker | 178—6 X |
| 2,784,246 | 3/1957 | Hurford | 178—6 X |
| 2,788,389 | 4/1957 | Purington | 178—6.7 |
| 2,808,455 | 10/1957 | Moore | 178—5.4 |
| 2,809,298 | 10/1957 | Cawein | 178—6.8 X |
| 2,931,857 | 4/1960 | Hammond | 178—6.5 |
| 2,941,044 | 6/1960 | Volkmann | 179—100.1 |
| 2,969,428 | 1/1961 | Wittling | 178—7.1 |
| 3,060,795 | 10/1962 | Corrigan et al. | 88—16 |

OTHER REFERENCES

The Living Brain, W. Grey Walter, W. W. Norton & Co. 1953, pages 83–113.

The Human Brain, John Pfeiffer, Harper & Bros. 1955, pages 156–161.

Strobe—The Lively Light, Howard Luray, Camera Craft Publ. Co. 1949, pages 11–15.

DAVID G. REDINBAUGH, *Primary Examiner.*

J. M. HORAN, *Examiner.*

R. L. RICHARDSON, *Assistant Examiner.*